(12) United States Patent
Camarota (10) Patent No.: US 10,458,604 B2
(45) Date of Patent: *Oct. 29, 2019

(54) DIFFUSED FLEXIBLE LED LINEAR LIGHT ASSEMBLY

(71) Applicant: ITC Incorporated, Holland, MI (US)

(72) Inventor: Michael V Camarota, Saugatuck, MI (US)

(73) Assignee: ITC Incorporated, Holland, MI (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/615,257

(22) Filed: Jun. 6, 2017

(65) Prior Publication Data

US 2017/0268732 A1    Sep. 21, 2017

Related U.S. Application Data (63) Continuation of application No. 14/467,384, filed on Aug. 25, 2014, now Pat. No. 9,695,991.

(Continued)

(51) Int. Cl.
   *F21S 4/00*    (2016.01)
   *F21K 9/61*    (2016.01)
   (Continued)

(52) U.S. Cl.
   CPC ............. *F21K 9/61* (2016.08); *F21K 9/27* (2016.08); *F21K 9/66* (2016.08); *F21K 9/69* (2016.08); *F21V 5/04* (2013.01); *F21V 15/012* (2013.01); *H05B 33/0821* (2013.01); *F21Y 2115/10* (2016.08); *Y02B 20/342* (2013.01); *Y10T 29/49* (2015.01)

(58) Field of Classification Search
   CPC ..... F21K 9/17; F21S 4/28; F21S 4/005; F21S 4/006; F21S 4/007; F21V 5/04; F21Y 2103/003
   USPC .................................................. 362/233, 223
   See application file for complete search history.

(56) References Cited

U.S. PATENT DOCUMENTS 3,984,923 A    10/1976  Rawson
4,159,490 A    6/1979   Wood
(Continued)

FOREIGN PATENT DOCUMENTS

CN    101482237         1/2008
CN    101482237 A *     7/2009
(Continued)

*Primary Examiner* — Matthew J. Peerce
(74) *Attorney, Agent, or Firm* — Varnum, Riddering, Schmidt & Howlett LLP (57) ABSTRACT

A diffused flexible LED linear light assembly (100) includes a flexible LED linear light component (102) having a flexible base (104) with individual LEDs (106) spaced longitudinally along the direction of the component (102). A partially translucent housing (120) houses the flexible LED linear light component (102). A curved section (124) of the translucent housing (120) varies in thickness in its lateral surfaces. The thickness may be varied so as to allow a relatively higher percentage of light transmission in areas of weakest LED output strengths. This light output intensity through the translucent housing, in view of the thickness variation, is substantially even or constant circumferentially and radially through the translucent section (124) of the translucent housing (120).

15 Claims, 8 Drawing Sheets

Related U.S. Application Data (60) Provisional application No. 61/872,139, filed on Aug. 30, 2013.

(51) Int. Cl.

| | | |
|---|---|---|
| *F21V 5/04* | (2006.01) | |
| *F21V 15/01* | (2006.01) | |
| *H05B 33/08* | (2006.01) | |
| *F21K 9/27* | (2016.01) | |
| *F21K 9/66* | (2016.01) | |
| *F21K 9/69* | (2016.01) | |
| *F21Y 115/10* | (2016.01) | |

(56) References Cited

U.S. PATENT DOCUMENTS

| | | | |
|---|---|---|---|
| 4,488,237 A | 12/1984 | Aronson | |
| 5,266,123 A | 11/1993 | Brand | |
| 5,363,865 A | 11/1994 | Brand | |
| 6,827,472 B1 | 12/2004 | Myburgh | |
| 6,914,194 B2 | 7/2005 | Fan | |
| 6,969,179 B2 | 11/2005 | Sloan | |
| 7,045,971 B2 | 5/2006 | Goto | |
| 7,048,413 B2 * | 5/2006 | Fan | G09F 13/22 362/224 |
| 7,160,019 B1 | 1/2007 | Kawakami | |
| 7,253,444 B2 | 8/2007 | Ikeda | |
| 7,709,292 B2 | 5/2010 | Sadwick | |
| 7,726,868 B2 | 6/2010 | Terada | |
| 7,758,230 B2 | 7/2010 | Terada | |
| 7,768,658 B2 | 8/2010 | Tsai | |
| 7,815,359 B2 | 10/2010 | Shimura | |
| 8,134,675 B2 | 3/2012 | Kawaguchi | |
| 8,322,883 B2 | 12/2012 | Cleaver | |
| 8,376,576 B2 * | 2/2013 | Sloan | F21V 15/015 362/221 |
| 9,695,991 B2 * | 7/2017 | Camarota | F21V 5/04 |
| 2004/0022061 A1 | 2/2004 | Shih | |
| 2004/0184288 A1 | 9/2004 | Bettis | |
| 2004/0228135 A1 | 11/2004 | Myburgh | |
| 2005/0231947 A1 * | 10/2005 | Sloan | F21V 21/005 362/235 |
| 2007/0274067 A1 | 11/2007 | Sloan | |
| 2008/0007945 A1 | 1/2008 | Kelly | |
| 2008/0159694 A1 | 7/2008 | Payne | |
| 2009/0073692 A1 | 3/2009 | Berger | |
| 2010/0061095 A1 | 3/2010 | Hoffmann | |
| 2010/0201239 A1 | 8/2010 | Mostoller | |
| 2011/0176298 A1 * | 7/2011 | Meurer | F21K 9/00 362/218 |
| 2012/0170258 A1 | 7/2012 | VanDuinen | |
| 2012/0250301 A1 | 10/2012 | Tung | |
| 2013/0018352 A1 | 1/2013 | Wu | |
| 2013/0082989 A1 | 4/2013 | Song | |
| 2013/0107526 A1 | 5/2013 | Ishibashi | |

FOREIGN PATENT DOCUMENTS

| | | |
|---|---|---|
| CN | 201954351 | 12/2010 |
| CN | 201866689 U | 6/2011 |
| CN | 203560766 U | 4/2014 |
| CN | 203963646 U | 11/2014 |
| CN | 104421712 A | 3/2015 |

* cited by examiner

DIFFUSED FLEXIBLE LED LINEAR LIGHT ASSEMBLY

CROSS-REFERENCE TO RELATED APPLICATIONS

This application is based upon and claims priority of U.S. patent application Ser. No. 14/467,384 filed on Aug. 25, 2014, which claims priority of U.S. Provisional Patent Application Ser. No. 61/872,139 filed Aug. 30, 2013.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

REFERENCE TO A "SEQUENCE LISTING," TABLE OR COMPUTER PROGRAM LISTING APPENDIX

Not Applicable.

BACKGROUND OF THE INVENTION

Field of the Invention

The invention relates to lighting configurations and, more particularly, to configurations primarily used as decorative assemblies in the form of flexible LED linear lights with diffusion properties.

Background Art

Various types of electrical lighting systems have been known and developed throughout the years since the early days of Edison's inventions. Originally, most electrical lighting (in the form of light bulbs and the like) existed for functional and generally practical uses, namely to provide illumination in what would otherwise be relatively dark spacial areas. As electrical lighting development matured, alternatives to conventional light bulbs were the subject of numerous inventions and other developments. For example, and is apparent in many retail establishments, fluorescent lighting was developed. Fluorescent lamps or tubes are typically relatively low pressure mercury-vapor gas discharge lamps which use fluorescence to produce visible light. Electrical current in the gas excites mercury vapor which produces short-wave ultraviolet light. It then causes a phosphor coating on the inside of the bulb to fluoresce, thereby producing visible light. Fluorescent lighting typically converts electrical power into usable light much more efficiently than incandescent lamps.

Although fluorescent lighting is used in both retail and commercial establishments, they have some disadvantages. Often, fluorescent light fittings are relatively bulky, and inconvenient for use in restricted spaces such as display cases and the like. Also, such light fittings can have a relatively short life and require frequent maintenance. Still further, fluorescent lighting can operate at a somewhat hazardous high voltage, with respect to the requirements of a starter/ballast.

Fluorescent lamps and gas discharge lamps have existed for a significant period of time, originally being displayed by Tesla in 1893 at the World Columbian Exhibition. In 1897, Nernst invented and patented his incandescent lamp, based primarily on solid state electrical lights.

Other significant developments occurred throughout the 20th century. In 1901, Peter Hewitt demonstrated a mercury vapor lamp. In 1981, Philips first marketed what was characterized as compact fluorescent energy saving lamps, with integrated conventional ballast. In 1985, Osram, in competition with Philips, started to market an electronic energy saving lamp. Shortly thereafter, the "white" sodium vapor lamp was introduced.

Other developments included ceramic metal halide lamps (originally developed by a team at Nela Parc in 1992). In 1994, T-5 lamps having a cool tip were introduced and became the most popular fluorescent lamps, with what was considered to be excellent color rendering. Also developed in this timeframe was the first commercial sulfur lamp.

In addition to the foregoing developments, Nick Hollnyak is credited with developing the first practical spectrum Light Emitting Diode (LED) in 1962. However, in fact, the general LED has been around, at least at a theoretical level, since initially discovered back in the first decade of the 20th century.

Hollnyak is typically credited as the father of the modern LED. An LED can generally be defined as a semi-conductor light source. When an LED is switched on, electrons are able to recombine with holes within the device, releasing energy in the form of photons. This effect is commonly referred to as electroluminescence and the color of the light is determined by the energy gap of the semi-conductor. LEDs present many advantages over incandescent light sources, including lower energy consumption, longer lifetime, improved physical robustness, smaller size, and faster switching. LEDs have been used in numerous applications, as diverse as aviation lighting, digital microscopes, automotive lighting, advertising, general lighting, and traffic signals. Their high switching rates are also useful in advanced communications technology.

One use for LED configurations which has become more popular during the last several years is the application of LEDs for lighting fixtures which may provide some functional illumination, but also may primarily act as decorative lighting assemblies. LED configurations which are useful for decorative lighting assemblies are rigid LED linear lights and flexible LED rope lights, including both indoor and outdoor applications. Rigid LED lights comprise LEDs conventionally mounted on a structure which links the LEDs together both electrically and physically. A housing surrounding the LED strip often consists of a rigid PVC material. These rigid light strings are typically mounted through adhesive backings to the desired structures. In contrast, and in accordance with the invention as described in the section titled "Detailed Description of the Preferred Embodiments" and defined in the section titled "Claims", the invention relates to a "flexible LED linear light assembly" which utilizes a series of spaced apart and electrically linked LEDs which are mounted on a flexible printed circuit board. In addition to the flexible printed circuit board, the flexible LED linear light assembly further consists of a flexible housing or lens, as opposed to the use of any type of rigid housing. Further, with flexible LED linear light assemblies in accordance with the invention, the LEDs may be surface mounted to a flexible polymer PCB. In contrast, flexible LED rope lights are assembled such that the LEDs are often attached to two buss wires.

Flexible LED linear lights in accordance with the invention can be utilized in many applications. For example, flexible LED linear lights in accordance with the invention can be applied as indoor lighting for outlining the edges of a kitchen counter, under-lighting baseboards in a movie theatre and similar applications. Flexible LED linear lights can also be utilized as outdoor lighting, including staircase lighting, outdoor patio or deck lighting, signage and outdoor artistic displays. Flexible LED linear lights are also suitable for use around a garden, pool, driveway, shed or the like. In addition, during holiday seasons, flexible LED linear lights in accordance with the invention can be readily used to create artistic messages or designs utilizing different colors and patterns.

One issue which arises with respect to the use of LEDs, and particularly a string of LEDs, relates to the concept that individual LEDs are effectively unidirectional hard-point light sources. Accordingly, an LED light string, standing alone, can exhibit both dark zones and "hot spots." It should be mentioned at this point that hot spots are not evident with the use of either florescent or neon tube lights. However, in other lighting assemblies which may be used, for example, as "under cabinet" lighting, hot spots can often show up on the counter top. Correspondingly, in wall wash lighting, the hot spots can show up as irregularities in the light patterns. Such hot spots have become more of a problem as LED brightness has increased in commercial products. To overcome these problems of LED hot spots, dark zones and overall light transmission uniformity, the LED lighting assembly can include a diffusion apparatus. The concept of diffusion for lighting apparatus relates to the transmission or reflection of electromagnetic radiation in the form of light, where the radiation is scattered in a number of different directions, and not totally reflected or refracted. Such activity is also referred to as "scattering" of light. The diffusion can also be referred to as a reflection or refraction of light (or other electromagnetic radiation) from an irregular surface or an erratic dispersion through a surface or other medium. Some of the assemblies which currently exist use what is characterized as "uniformity tape," which is a microstructured thin-shell mechanism for mixing and diffusing the light generated by the LEDs. It is particularly utilized in edge-lit digital displays, including monitors, televisions and signage. In these systems, light generated by the LEDs is attempted to be spread evenly to all parts of a display by a light guide, which may typically consist of a plate of polymethyl methacrylate. This guide transports light by total internal reflection, commonly referred as "TIR." Extraction patterns on the surface of the light guide will mete out the light and generate a uniform brightness distribution. However, even with the light guide, dark zones can be noticeable along the injection edge closest to the LEDs. Further, and somewhat obvious, dark zones will also influence the spacing between LEDs, which limits the ability of designers to reduce the number of LEDs in a display, despite what would exist as far as cost advantages and increased energy efficiency. Further, light-mixing of certain known light guides makes digital displays highly sensitive to variations in LED color and brightness. Still further, closely packed LEDs can also create thermal management issues.

In addition to issues associated with uniformity of diffusion for LED light strings and similar assemblies, issues also exist with respect to facilitating manufacture of diffused LED light strings. For example, the manufacturing process should preferably facilitate assembly of the LED light strings in positions desired within a housing comprising, for example, a translucent housing material. In addition, one problem which has existed in known assemblies relates to the fact that various LED lighting assemblies utilizing flexible LED light strings also utilize end cap structures which secure the ends of elongated housing and provide entry of electrical power into the housing interior for connection with the light string. During the manufacturing process, it is sometimes difficult to appropriately mount the end cap structure to the ends of the housing, with respect to their interfaces. For example, with certain mounting processes, areas which could be characterized as "steps" or other non-linear or non-continuous edges or other projections can be formed between the housing structure and the end cap structures. These formations can increase the difficulty of properly mounting the end cap structures to the housing, and can also take away from the overall aesthetics of the diffused light string assembly.

With the foregoing issues in mind, reference is now made to a number of patents and patent application publications which are associated with LED strings, translucent housing members and/or other optical and electrical principles. For example, the commonly assigned U.S. Patent Application Publication to VanDuinen et al., 2012/0170258, is directed to displays of case lighting having a lens with integrally formed features on its interior for purposes of mechanically retaining LED units within the interior. At least one of the LED units consists of a base and diodes mechanically engaged on a rigid PCB with integrally formed features of the lens. An electrical connector is provided to connect the LED units to a power source. At least one end cap incorporates the electrical connector. For purposes of sealing the assembly, a boot seal is provided for sealing the electrical connector and a plug cover is used to cover any unused electrical connectors which may be provided. An adhesive is used to secure the end cover to the lens and seal the connection therebetween. With this configuration, the lighting assembly is suitable for use in wet or potentially explosive environments.

Turning to other specific patent references, a number of the references teach general concepts associated with the use of LED light strings within translucent housing members. For example, U.S. Patent to Cleaver et al., U.S. Pat. No. 8,322,883, discloses an illumination device having a rod-like member with a light receiving surface and a light-emitting surface. An elongated light source extends along a position adjacent to a light receiving surface of the member, such that the light entering the member from the elongated light source and through the light receiving surface is scattered. This scattering process causes a light intensity pattern which appears substantially uniform along the light-emitting surface of the rod-like member. The Cleaver et al. patent is specifically directed to neon lighting, and has relevance only with respect to its discussion of point light sources and advantages of providing a light intensity pattern which appears substantially uniform along a light-emitting surface of a rigid rod-like member.

The U.S. Patent to Ikeda, U.S. Pat. No. 7,253,444, is directed to a structure and process for manufacturing the structure which consists of a casing for use with a light-emitting unit. Ikeda discloses the concept of the unit having a substrate and light-emitting diodes housed within the casing. When silicone is injected through an injection opening, the silicone flows through the entirety of the housing, and then overflows from a discharge opening. The purpose for the silicone injection is to "push outside" air or air bubbles which have formed within the light-emitting unit.

The U.S. Patent Application Publication to Ishibashi et al., 2013/0107526 is directed to the use of cluster boards, with a series of LEDs mounted in an array on central parts of the boards in a transverse direction of the boards. The LED mounting portions in the first and second boards are formed so as to be bendable.

The U.S. Patent Application Publication to Mostoller et al., 2010/0201239 is directed specifically to an end cap configuration for a light tube having a LED light string. The end cap assembly includes an end cap connector extending from the body and holding contacts with first mating portions configured so as to be electrically connected to the circuit board, and second mating portions configured to electrically connect to the socket connector. The end cap assemblies of Mostoller et al. do not provide for any flush mounting of the cap with an outer surface of the housing profile.

The U.S. Patent to Goto, U.S. Pat. No. 7,045,971, is directed to an illuminating apparatus having full-color LEDs, with a controller and power supply cable. The light emitting unit includes a series of light emitting elements having different emission colors. Other than showing a string of full-color LEDs for decorative purposes, the Goto patent does not appear to have any significant relevance.

The U.S. Patent Application Publication to Kelly, et al., No. 2008/0007945 is directed to a cabinet illuminator having a pair of LED lines. The LED lines are found in an elongated body having a heat transfer portion for conduction of heat from the LEDs to the outer surface of the body. An engagement configuration exists in the ends of the body for engagement with other structural members of a display cabinet. The end connectors do not appear relevant to the ITC invention.

The U.S. Patent to Terada, et al., U.S. Pat. No. 7,758,230, discloses a spread illuminating apparatus having an LED, with a transparent resin plate and a light reflecting sheet. The plate includes slits adapted to have flap portions of the light reflecting sheet inserted therein. An adhesive tape with flexibility is placed along at least one flat portion of the reflecting sheet, so as to cover at least one slit of the resin plate. The light reflecting sheet is prevented from warping or undulating in spite of the difference in thermal expansion coefficients between the materials of the resin plate and the reflecting sheet. Light emitted from the LED and traveling in the resin plate is totally reflected by the flat portions, and thereby prevented from leaking from the outer side surfaces of the resin plate.

Other references include the following:
  The U.S. Patent Application Publication to Berger, et al., 2009/0073692 is directed to a modular and expandable lighting system.
  The U.S. Patent Application Publication to Payne, 2008/0159694 is directed to a lens configuration for optical touch systems.
  The U.S. Patent to Shimura, et al., U.S. Pat. No. 7,815,359, is directed to a spread illuminating apparatus utilizing a transparent resin plate.
  The U.S. Patent to Terada, et al., U.S. Pat. No. 7,726,868, is directed to a spread illuminating apparatus, and is primarily related to a method of injection molding for the transparent resin plate.
  The U.S. Patent to Kawakami, U.S. Pat. No. 7,160,019, is directed to a side-lighting surface light source device, along with a manufacturing method for the same. The device includes a light source, reflective member, and light guide plate.

The following patents are directed to various types of display devices utilizing LED configurations.
  Song, et al., Publication No. 2013/0082989;
  Kawaguchi, et al., U.S. Pat. No. 8,134,675;
  Myburgh, U.S. Publication No. 2004/0228135.

Other patents utilizing LED string apparatus include the following:
  Sadwick, et al., U.S. Pat. No. 7,709,292;
  Rawson, et al., U.S. Pat. No. 3,984,923;
  Aronson, et al., U.S. Pat. No. 4,488,237;
  Brand, U.S. Pat. No. 5,266,123;
  Brand, U.S. Pat. No. 5,363,865;
  Myburgh, U.S. Pat. No. 6,827,472;
  Wood, U.S. Pat. No. 4,159,490;
  Bettis, 2004/0184288;
  Yoshida, et al., 2013/018352;
  Tsai, et al., U.S. Pat. No. 7,768,658.

SUMMARY OF THE INVENTION

In accordance with the invention, a light assembly is adapted for use as an LED-based source of light for utilitarian and/or decorative purposes. The light assembly includes an elongated flexible LED linear light component with a series of spaced-apart LEDs supported on a flexible base. The assembly also includes a flexible translucent housing or lens which has an elongated configuration for laterally enclosing the flexible LED linear light component. At least a portion of the housing forms a section having translucent properties. Further, a thickness of the translucent section of the translucent housing may be varied in cross section. This variation allows for corresponding variation in the percentage of light transmission. The variation in light transmission depends on the thickness of the translucent section of the housing at any given position. For example, a user may wish to have a light output intensity through the translucent housing which is substantially even or constant circumferentially and radially through the translucent section of the housing or lens. In this case, the designer can structure the light assembly where by varying the thickness of the translucent section, a relatively higher percentage of light transmission can be achieved in areas of weakest LED output strength. With such a variation, the light output intensity through the housing is substantially even or constant circumferentially and radially throughout the section of the translucent housing or lens. However, it should be emphasized that other thickness variations can be utilized, without departing from certain of the principal concepts of the invention.

The translucent housing can include a housing wall having a first thickness from an interior apex located on an inner surface of the translucent housing, and extending perpendicular to the plane of the housing wall from the interior apex through the housing wall. This perpendicular extension occurs on an axis AA which is perpendicular to a plane of the LEDs. The housing wall of the translucent section decreases in thickness as the angle formed by the plane of the LEDs in a straight line drawn from the plane of the LEDs through the translucent housing wall also decreases.

In accordance with another concept of the invention, a method is provided for manufacturing the light assembly described in the prior paragraphs herein. The method includes pulling the flexible LED linear light component through an extrusion of material which composes the translucent housing. A channel is then constructed within an interior of the translucent housing formed by two inwardly directed projections adjacent a bottom inside of the housing.

In accordance with still further concepts of the invention, the light assembly is sized so that a plane of the LEDs is spaced a distance IH from an interior apex located on an inner surface of the translucent housing. This distance is measured from the LEDs along an axis AA which is perpendicular to the plane of the LEDs. The translucent housing laterally encloses an internal gap between the LEDs and the inner surface of the translucent housing. The internal gap is filled with air or silicone gel. Further, the distance IH is of a sufficient size so that intersecting ray patterns from light rays generated by adjacent ones of the LEDs can exhibit combination and interference prior to contacting the inner surface.

Still further, the change in transmissibility from the air or silicone filled gap to materials composing the translucent housing, in combination with the scattering of the light rays through reflection and transmission, causes a diffusion pattern of light intensity to be substantially even or constant along an axial length of the flexible LED linear light component and the translucent housing. Still further, the relative dimensions of the translucent housing, the internal gap, the distance IH and the spacing of adjacent ones of LEDs is such that dark zones and hot spots are substantially eliminated for resultant light viewed external o the translucent housing.

In accordance with other concepts of the invention, the light assembly includes end means for enclosing the elongated flexible LED linear light component at a lead end and a trailing end. The end means can include an end cap lead end and an end cap trailing end. In addition, the assembly can include electrical conductive means connected to the flexible LED linear light component and a source of electrical power. The electrical conductive means can include a pair of electrical pigtails connected between the flexible LED linear light component and the electrical power source.

In addition, the end cap lead end can include one or more apertures for receiving the electrical conductive means from the electrical power source, and permitting entrance into an interior of the translucent housing for electrical connection to the flexible LED linear light component.

The light assembly can be characterized as having a translucent housing with a curved section having the translucent properties. The housing also includes a base section which is integral with the translucent section, but does not transmit any light rays from the LEDs.

Still further, the end cap lead end and the end cap trailing end each have an inner projection for purposes of anchoring and securing the respective end cap to the translucent housing. The end caps are structured and the inner projections are sized so that each of the end caps is mounted flush with an outer surface of the translucent housing profile, without steps or other discontinuities between the outer surfaces of the end caps and the outer surface of the translucent housing. The translucent housing can also include a pair of inwardly directed projections adjacent a bottom inner area of the translucent housing. These projections form a channel that provides the capability of locating the flexible LED linear light component against a flat portion of the housing.

In accordance with further concepts of the invention, each of the inner projections includes a semi-circular cross-sectional profile, having a curved or arcuate shape. The shape corresponds to a shape of the inner surface of the translucent housing to which the inner projection is adhered. Each of the end caps can be sealed with the flexible translucent housing through the use of an adhesive having water resistant and UV-stable properties. The end caps can be further sealed to the flexible translucent housing through the use of a coating material suitable for bonding and sealing the assembly. Further, each of the inner projections can be of an arcuate shape having a beveled terminal end.

BRIEF DESCRIPTION OF THE DRAWINGS

The invention will now be described with respect to the drawings, in which:

FIG. 8 is an upper, perspective view of the end cap lead in;

FIG. 9 is an elevation view of the end cap lead in shown in FIG. 8, as viewed from the interior of the diffused flexible LED linear light assembly, and looking outwardly toward the interior face of the end cap lead in;

DETAILED DESCRIPTION OF THE PREFERRED EMBODIMENTS

The principles of the invention are disclosed, by way of example, in a diffused flexible LED linear light assembly 100 as illustrated in FIGS. 1-21 and disclosed in the following paragraphs. As described in the section of this Application titled "Background Art," LED rope or flexible LED linear lights are relatively well known and commercially available for a number of purposes, particularly including decorative lighting systems. A problem which exists with respect to the use of LED rope or flexible LED linear lights relates to the fact that they can exhibit both dark zones and "hot spots." The hot spots have become more of a problem as LED brightness increases. To reduce the problems associated with LED hot spots and dark zones, many LED lighting assemblies include diffusion apparatus. However, even with no diffusion techniques, uniformity is still very difficult to achieve along an axial length of an LED string. Further, in view of LED lights effectively existing as point sources, photometric profiles of conventional LEDs typically exhibit a bell-shaped intensity graph, centered on the LED device center. It is thus advantageous to achieve higher percentages of light transmission in areas of relatively "weak" LED output strengths. If this can be achieved, light output can be generated in a manner such that intensity is substantially even or constant in a radial or circumferentially direction around the LED array. In addition to achieving uniformity, the designer may wish to achieve other functions, where uniformity is not necessarily the goal, but instead a certain other type of light transmission pattern is desired to be achieved. In known flexible LED linear light systems, other problems can exist with respect to both manufacturing methods and overall structure with respect to interfaces between elements of the flexible LED linear light and other physical elements, such as end caps and the like. For example, with flexible LED linear lights used for decorative purposes, it is advantageous if the "lines of design" for such systems are relatively smooth and textured. Accordingly, care needs to be taken to avoid, for purposes of aesthetics, jagged or discontinuous edges and interfaces between the flexible LED linear light system components. In addition to the foregoing, it should be mentioned that a consistent cross sectional shape for the entirety of the axial length of the flexible LED linear light allows for uniform containment for mounting in channel-shaped holders. It also reduces the size of through passages required for mounting in partitioned cabinets and the like.

With the foregoing in mind, the diffused flexible LED linear light assembly 100 solves or otherwise significantly overcomes the afore-described problems associated with known flexible LED linear light systems. Turning to the diffused flexible LED linear light assembly 100, and with reference first and primarily to FIGS. 1-7, the diffused flexible LED linear light assembly 100 includes what can be characterized as a flexible LED linear light component 102. The basic design of a flexible LED linear light comprises a series of electrically connected LEDs mounted on a flexible printed circuit board (or "PCB"). In addition to the flexible printed circuit board, the flexible LED linear light also includes a flexible translucent housing or lens which essentially encases the flexible LED linear light printed circuit board.

It should also be mentioned that prior to the substantive development of LEDs, "incandescent linear light" was known and used for various applications which required a flexible and out of sight light source. However, in view of the advancement of LED technology, incandescent linear light has essentially become obsolete.

Figure 20:
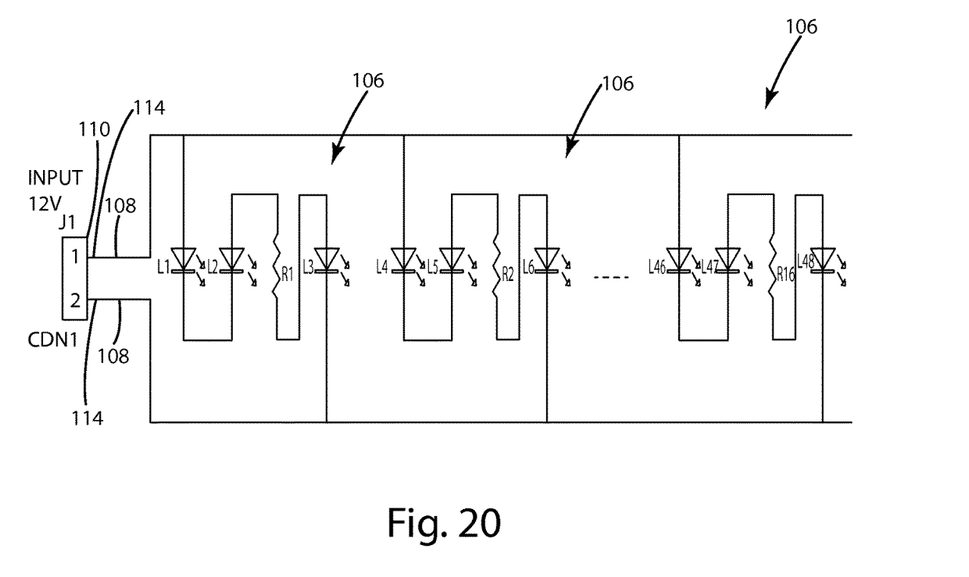
FIG. 20 is a partial schematic drawing illustrating several of the LED elements and their circuit connections to an external power source, as they are associated with the flexible LED linear light.
Figure 21:
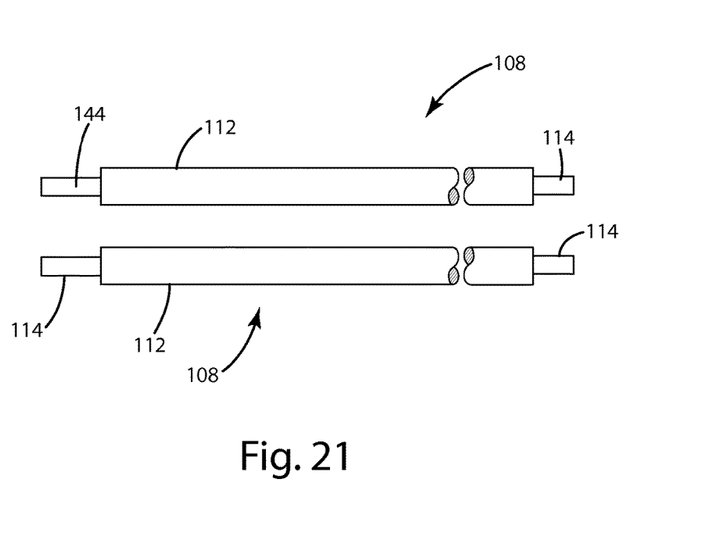
FIG. 21 is an enlarged view of the electrical pigtails shown in FIG. 6, which electrically connect the flexible LED linear light to an external power source.

The flexible LED linear light component 102 illustrated in the drawings comprises an elongated and generally rectangular flexible base 104, with individual LEDs 106 spaced longitudinally along the elongated direction of the component 102. Each of the LEDs is in the form of a conventional diode configuration. FIG. 20 is a relatively simplified schematic diagram of the circuitry of the LEDs 106. If desired, the LEDs 106 may include a flexible polymer-based printed circuit board, where the LEDs 106 are mounted on the base 104 for a relatively low profile design and small, but efficient size. The base 104 and LEDs 106 may be manufactured in various lengths and widths, so as to accommodate the desired height and sizing of the flexible LED linear light assembly 100.

Figure 5:
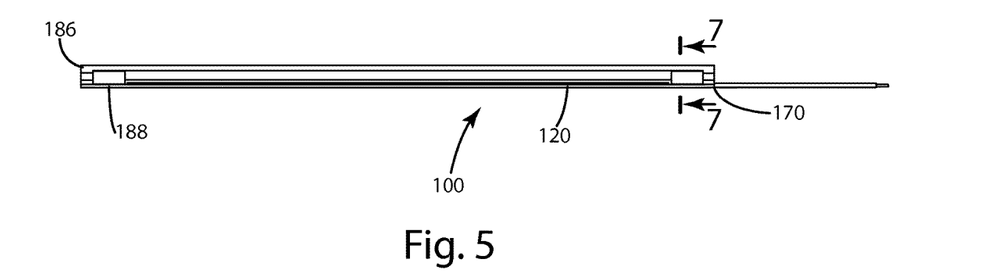
FIG. 5 is a plan elevation view of the diffused flexible LED linear light assembly illustrated in FIGS. 1-4.
Figure 6:
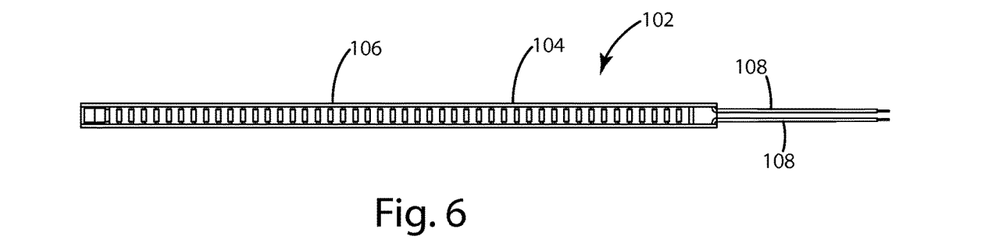
FIG. 6 is a partial plan view of the diffused flexible LED linear light assembly shown in FIG. 5, but specifically showing the flexible LED linear light, individual LEDs, and connector cables to an external power source.

In addition to the base 104 and the LEDs 106, the flexible LED linear light component 102 can also be characterized as including or otherwise being connected to a pair of electrical connectors, commonly referred to as "pigtails." The electrical pigtails utilized with the light assembly 100 are illustrated as they are connected to the flexible LED linear light component 102 in FIGS. 5 and 6. These pigtails are also primarily functionally shown in FIG. 20 as being interconnected between the LEDs 106 and an external source of electrical power 110. In addition, the electrical pigtails 108 are expressly shown in a stand-alone configuration in FIG. 21. Each of the pigtails 108 is shown as having a protective cable or sheath 112 surrounding and encasing conductive wires of connectors 114. The portion of the conductive wires 114 which are exposed are formed by "stripping back" the cable sheaths 112 from the wires 114. One end of the wires 114 will be connected to one end of the string of LEDs 106 through the base 104. The other ends of the conductive wires 114 will be connected to the external source for electrical power 110 shown in FIG. 20. As an alternative, a miniature surface mounted connector could also be utilized as a means to provide the electrical connection, should the need arise.

In addition to the LED tape component 102 and the electrical pigtails 108, the diffused flexible LED linear light assembly 100 further comprises a partially translucent housing 120 which is utilized to house and encase the flexible LED linear light component 102, as well as one set of ends of the electrical pigtails 108. For purposes of brevity in description, the "partially translucent housing" 120 will be referred to herein as the "translucent housing." In addition to housing and encasing the flexible LED linear light component 102 and one set of ends of the electrical pigtails 108, the translucent housing 120 also serves to function as a partially translucent lens for the light emitted from the LEDs 106 of the flexible LED linear light component 102. Still further, the translucent housing 120 functions so as to exhibit a certain level of diffusion of the light emitted from the LEDs 106. The overall shape and structure of the translucent housing 120 is shown in various figures of the drawing, including FIGS. 1, 2, 4, 5, 7 and 17-19. The translucent housing can be constructed of a number of different materials, including a flexible polymer such as silicone 535U.

With reference particularly to FIGS. 2, 4, 7 and 19, the translucent housing 120 comprises one "side" which can be characterized as a flat base section 122. The flat base section 122 can be of an opaque formulation and, given the positioning of the LEDs 106, does not exhibit any translucent properties. With reference to the positioning shown in FIG. 4 in cross-sectional configuration, extending upwardly from both sides of the flat base section 122 is a translucent curved section 124. The curved section 124, along with the base section 122, completes a lateral enclosure of the flexible LED linear light component 122.

Figure 1:
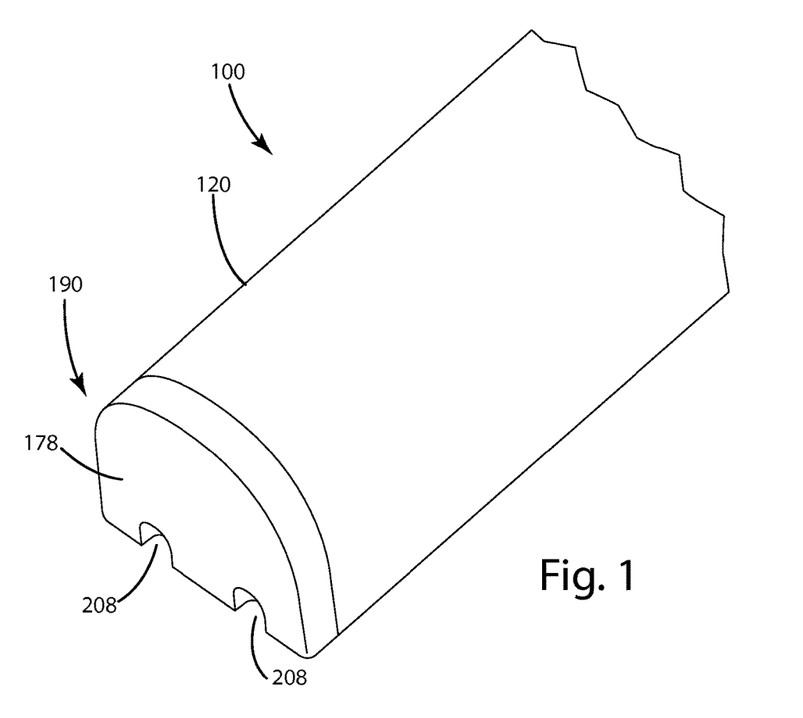
FIG. 1 is a left-side perspective view of a partial length of a diffused flexible LED linear light assembly in accordance with the invention.
Figure 2:
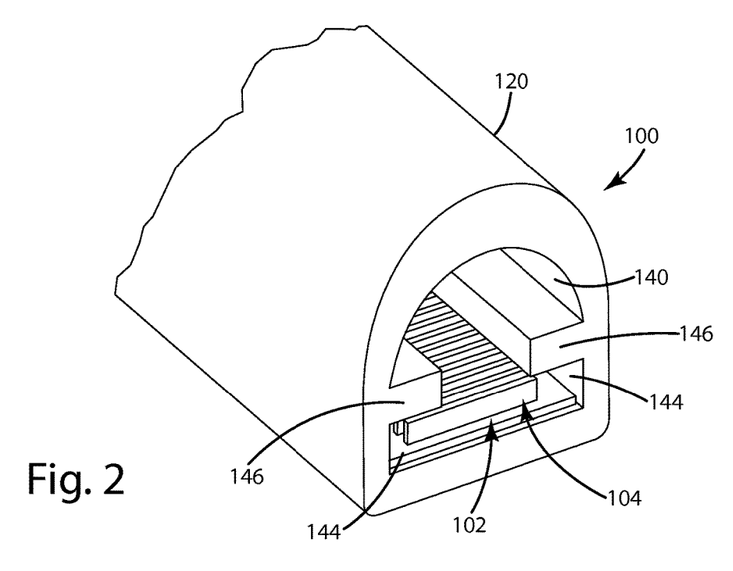
FIG. 2 is a right-side perspective view of the diffused flexible LED linear light assembly shown in FIG. 1, but further showing a partial interior of the flexible LED linear light assembly, with FIG. 2 showing one end of a translucent housing, with an end cap omitted from the end of the housing, and therefore partially showing an interior of the translucent housing, with the flexible LED linear light located against the bottom of the "D-shaped" translucent housing, and further showing a pair of opposing inner projections which serve to locate the flexible LED linear light within a channel formed by the two opposing projections.
Figure 3:
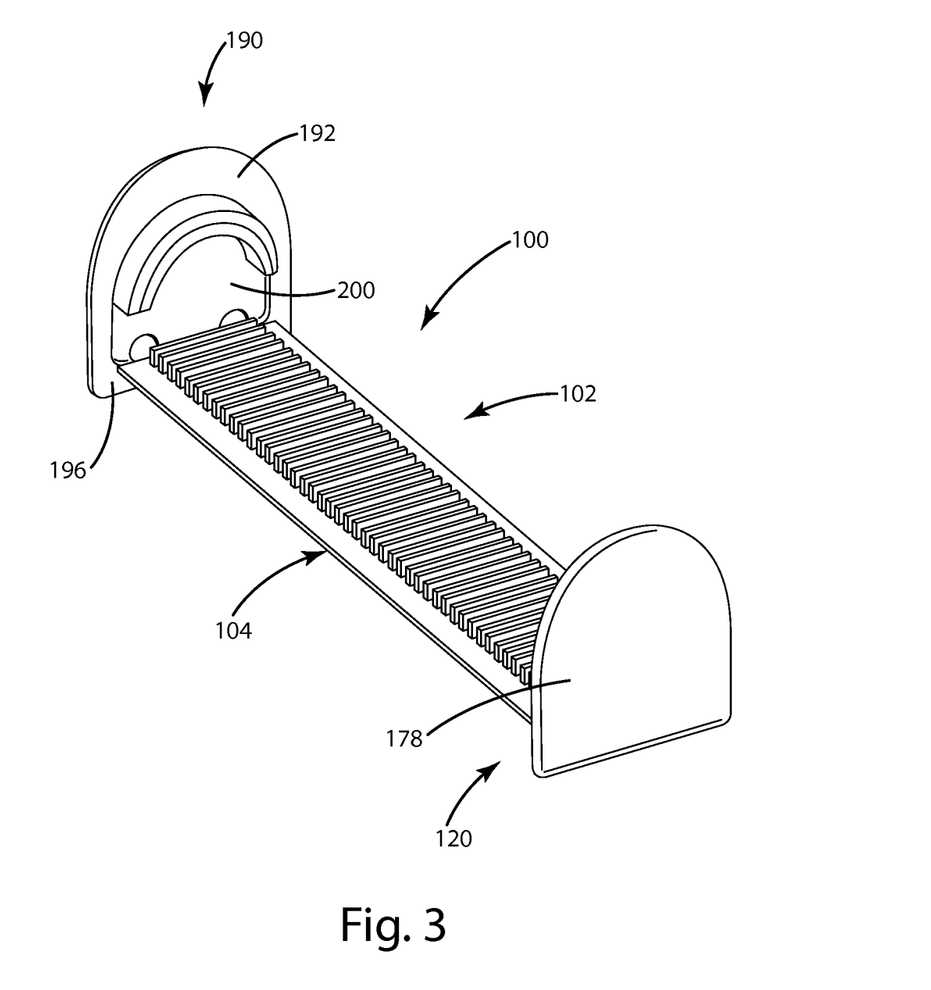
FIG. 3 is a perspective view of the flexible LED linear light assembly shown in FIG. 1, showing one of the end caps, and further with the omission of the translucent housing structure.
Figure 4:
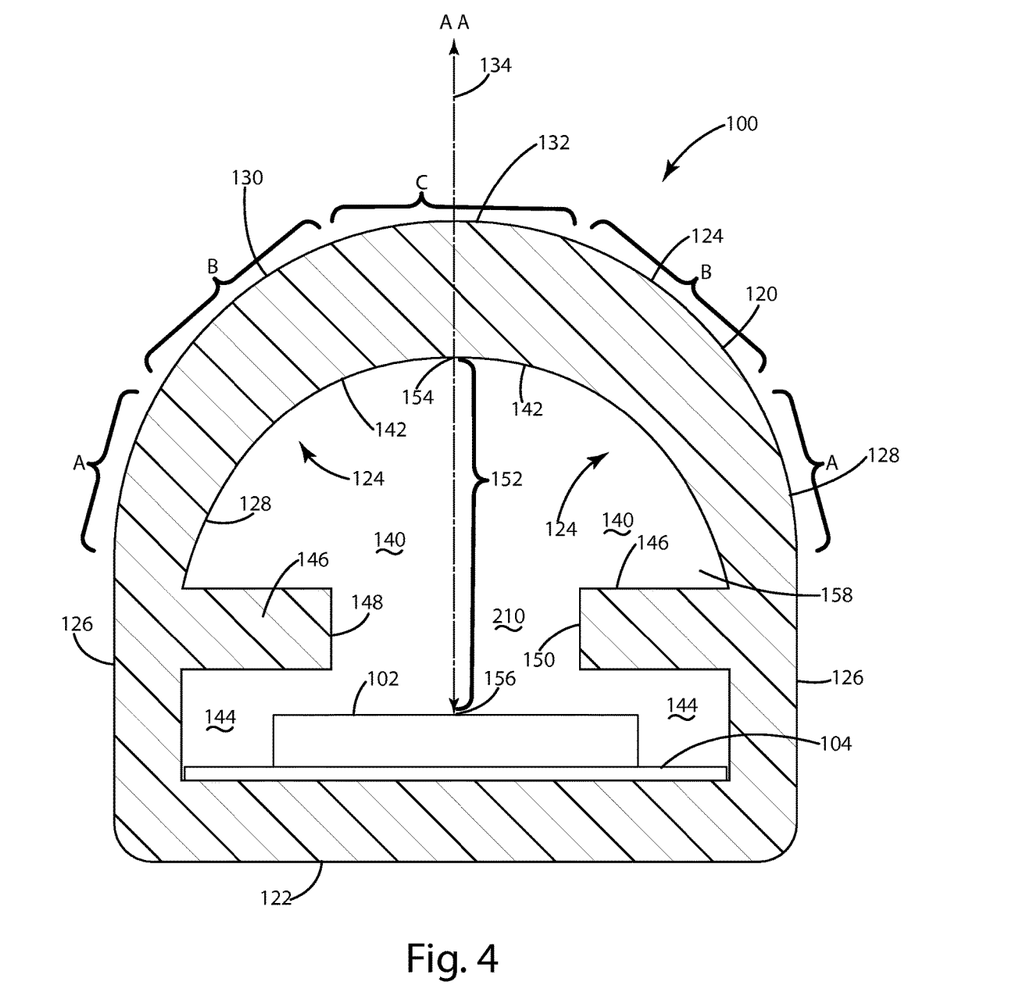
FIG. 4 is an end view of the translucent housing structure, with the flexible LED linear light positioned therein, and specifically showing the variation in the thickness of the translucent portion of the housing structure in a cross-section taken along an axial direction.

In accordance with certain concepts of the invention, the curved arcuate section 124 of the translucent housing 120 varies in thickness (in a cross-sectional configuration) in its lateral surfaces. The variation in thicknesses along the curved section 124 is particularly shown in FIGS. 4, 7 and 19. For purposes of description of these thickness variations, FIG. 4 shows the curved arcuate section 124 as being divided among various segments along the housing 120. Specifically, FIG. 4 first shows a pair of base connecting segments 126, which could be characterized as being connected to or otherwise integral with the ends of the flat base section 122 and depending upwardly (as viewed in FIG. 4) therefrom. These base connecting segments 126 can be relatively constant with respect to thickness. Again with respect to the viewing direction of FIG. 4, extending upwardly from the base connecting segments 126 are segments 128. The segments 128 are illustrated on FIG. 4 as extending along the outer surface of the housing 120 for a distance A. As further shown in FIG. 4, the thickness of the segments 128 vary and increase from the upper portion of the base connecting segments 126 to what is shown in FIG. 4 as the upper portions of segments 128. For purposes of the description, the average thickness of each of the segments 128 can be characterized as thickness X. Although not of an absolute necessity in accordance with the invention, the segment 128 shown on the left side of FIG. 4 can essentially be a mirror image of the segment 128 shown on the right side of FIG. 4. Accordingly, each of these segments 128 has a length along the housing surface of A, with an average thickness of X. Again, it is emphasized that the references to these various segments and thicknesses are solely for purposes of description, and the actual translucent housings 120 in accordance with the invention do not necessarily have any structural differentiation among these segments, other than the relative relationships with respect to housing thicknesses.

Extending upwardly from the top of each of the segments 128 are further segments which can be characterized as segments 130. As again shown in FIG. 4, the segments 130 extend upwardly along the curved arcuate section 124 of the housing 120, and are illustrated in FIG. 4 as having a segment length B. Again for purposes of the description, the average thickness along the length B of the segments 130 can be characterized as thickness Y. In accordance with the invention, the average thickness Y of the segments 130 will be greater than the average thickness X of the segments 128.

Continuing with reference to FIG. 4, the translucent curved arcuate section 124 of the translucent housing 120 includes a segment 132 which extends upwardly from the upper portions of segments 130 and interfaces with each of the upper portions of segments 130. The segment 132, consisting of the "uppermost" portion of the translucent housing 120, is shown in FIG. 4 as having a length C along the surface of the housing 120. For purposes of description of the invention, the segment 132 can be characterized as having an average thickness Z. In accordance with the invention, the average thickness Z will be greater than the average thickness Y which, in turn, was previously described herein as being greater than the average thickness X.

The foregoing description using what can be characterized as only imaginary or "representative" segments and average thicknesses of the housing 120 serves to illustrate one of the principal concepts of the invention. The LEDs 106 and the elongated base 104 are positioned within the interior of the translucent housing 120 as particularly shown in several of the drawings, including FIGS. 1 and 7. With this configuration, and assuming that the thickness of the translucent section 124 of the housing 120 was uniform along its circumference in the axial direction, the intensity of the light transmitted to the interior surface of the translucent section 124 would be greatest at the center of segment C, corresponding to a direction to which is perpendicular to the transmitting plane of each of the LEDs 106. That is, the intensity of the light of the LEDs 106 as it impinges on the interior surface of the translucent section 124 is greatest along what is shown as axis AA, or axis 134 in FIG. 4. Further, in accord with this same concept, the photometric profile of each of the LEDs 106 will typically form a bell-shaped array which is centered along axis AA and will be of an approximately 120 degree included angle. That is, as the angle of the LED light rays move away from the perpendicular angle formed by axis AA (i.e., the light ray angle moves from the area of segment C to the areas of segments B and A), the natural light intensity of each of the LEDs 106 will decrease. This can result in a significant disadvantage with respect to the aesthetics of the resultant light distribution outside of the flexible LED linear light assembly. Further, to the extent that the flexible LED linear light assembly 100 is being used in a functional manner so as to provide light for a practical purpose, the drop off of light intensity away from axis AA also is a significant disadvantage.

Figure 7:
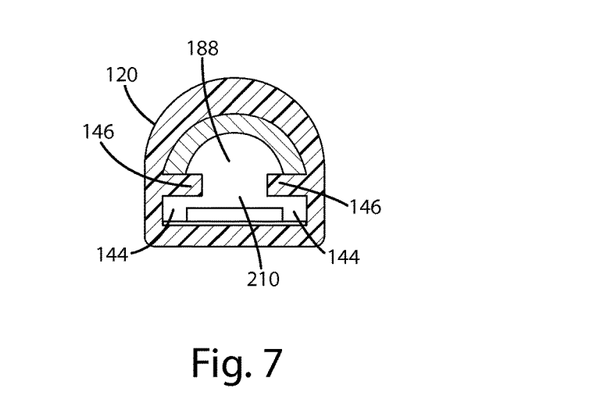
FIG. 7 is a sectional end view of the diffused flexible LED linear light assembly shown in FIG. 5, taken along section lines 7-7 of FIG. 5.

To overcome these problems, the translucent housing 120, as particularly shown in FIGS. 4 and 7, is constructed with the thickness of the housing 120 varying along the areas corresponding to segments A, B and C. Preferably, the thickness variation curve is relatively "smooth" and "steps" or other irregularities in the photometric profile curve are not exhibited. In accordance with the foregoing, the average thickness Z of segment C shown in FIG. 4 will be greater than the average thickness Y of each of the segments B. Correspondingly, the segments A will have an average thickness X which is less than the average thickness Y and the average thickness Z. By appropriately varying the foregoing thicknesses of the translucent housing 120 in cross section, a higher percentage of light transmission through the body of the translucent housing will occur within segments A, as compared to the percentage of light transmission allowed to pass through the translucent housing 120 at the locations of segments B. In turn, the percentage of light transmission allowed to pass through the translucent housing 120 in the areas of segment C will be less in percentage than the percentages of transmission in segments B and A. With these differences in the percentages of light transmission through the thicknesses of housing 120, it is therefore possible to generate and provide for a uniform intensity of the LED light output throughout the transmission area corresponding to the 120 degree included angle. That is, it has been found that by varying the thickness of the housing 120 in cross section, higher percentages of light transmission in areas having the relatively "weakest" LED output strength is achieved. The light output can then be generated with a strength which causes the output to be substantially "even" or "constant" in a circumferential direction, along the axial direction of the flexible LED linear light component 102.

To achieve an appropriate uniformity of light intensity along the axial length of the translucent housing 120, reference is made to the interior structure of the area encased by the translucent housing 120. This area is illustrated in FIG. 4 as interior 140. This interior 140 can be characterized as having an "interior height IH" as also shown in FIG. 4. This interior height IH, which is also characterized as interior height 152, extends from what could be characterized as the LED base level 156 which essentially exists on the same level as the uppermost lens portion of each of the LEDs 106. This interior height IH then extends upwardly in a perpendicular direction relative to the plane of the LEDs 106, to the interior apex 154. This interior apex 154 can be characterized as the uppermost position of an inner surface 142 of the translucent housing 120. In accordance with certain novel concepts of the invention, the open interior 140 is filled with air or a silicone gel 158, again as shown in FIG. 4. If the interior height IH is of a sufficient value, and assuming that the contours of an inner surface 142 have a curvature substantially corresponding to the curvature shown in FIG. 4, a significant change in "transmissibility" from the air or silicone gel to the translucent housing material will be existent. Further, with the sufficiency of the interior height IH, and appropriate positioning of adjacent LEDs 106, the intersecting ray patterns from the adjacent LEDs can combine and interfere with each other. That is, under these appropriate circumstances, the ray patterns can cause both combination and interference of the light rays. Interference is well known and is a phenomenon in which two rays will superimpose and form a further resultant wave of greater or lower amplitude. This type of interference usually refers to the interaction of waves that are correlated or coherent with each other, either because they came from the same source or, as in this case, because they have the same or nearly the same frequency. Such intersecting ray patterns readily form combining waves. With the appropriate dimensions regarding interior height IH and the spacing of the individual LEDs 106, the resultant intersecting ray patterns from the adjacent LEDs can combine and interfere prior to hitting the inner surface 142 of the translucent housing 120. In accordance with all of the foregoing, the change in transmissibility from the air or silicone to the housing material, plus the light scattering occurring through reflection and transmission will cause the diffusion pattern of the light to be extremely even or constant across the axial length of the LED component. With this phenomena occurring, the diffusion pattern is extremely even or constant across the entirety of the axial length of the LED stream. This occurrence virtually eliminates the well-known "hot spots" which are often created by individual LEDs which are used in strips where there are relatively small distances between the LEDs without the gap or open interior 140 formed by the appropriate dimensions and the use of air or silicone gel as a "fill" for the interior of the translucent housing 120. The general concepts associated with hot spots were previously discussed in detail in the section entitled "Background Art" of this application. Again, and in accordance with the invention, the size of the open interior 140, and particularly the size of the interior height IH, in combination with the open interior being filled with air or silicone gel, results in the diffusion pattern for the LED light intensity to be extremely even or constant along the axial length of the flexible LED linear light component 102. This diffusion pattern, which essentially eliminates hot spots created by the individual LEDs 106, results from both the change in transmissibility from the air or silicone gel within the open interior 140 to the translucent housing 120, in combination with the sufficiency of the interior height IH.

It should be emphasized that the foregoing description of the thickness variations for the housing 120 corresponds to certain embodiments in accordance with the invention. In accordance with certain general aspects of the invention, the designer may wish to obtain a diffusion pattern which is not necessarily an attempt to provide uniformity of light intensity in radial and circumferential directions. Instead, the designer may wish to obtain other patterns. In accordance with the invention, the designer can achieve light intensity variation and diffusion variation by other variations in thicknesses of the translucent housing, in the radial and/or circumferential directions.

Turning to other aspects of the diffused flexible LED linear light assembly 100 in accordance with the invention, the assembly 100 further includes a pair of end caps, comprising an end cap lead end 170 and an end cap trailing end 190. The end cap 170 is illustrated in FIGS. 1, 3 and 5-7 in combination with the translucent housing 120. Further, the end cap 170 is shown in detail in a stand-alone configuration in FIGS. 8, 9 and 10. Correspondingly, the end cap trailing end 190 is shown in detail in a stand-alone configuration in FIGS. 11-16. The end caps 170 and 190 are fitted on the ends of the translucent housing 120, and are used to enclose and encase the flexible LED linear light component 102 within the lower portion of the interior 140 of the housing 120. Further, as described in subsequent paragraphs herein, the trailing end cap 190 includes means for permitting the electrical pigtails 108 to be received through the end cap 190 for providing electrical power between the external source 110 and the flexible LED linear light component 102.

Figure 8:
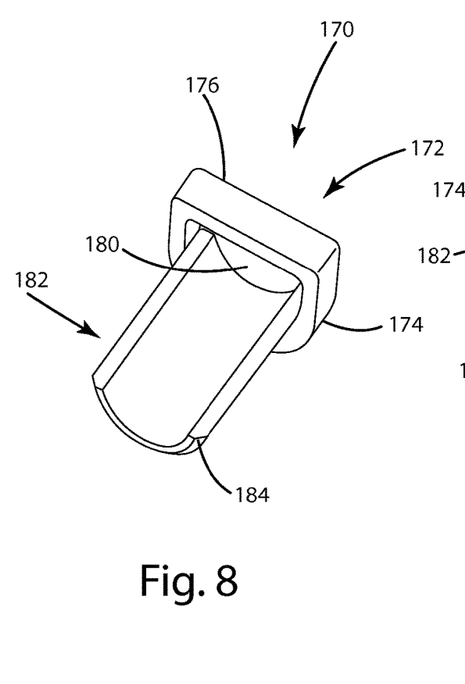
Figure 9:
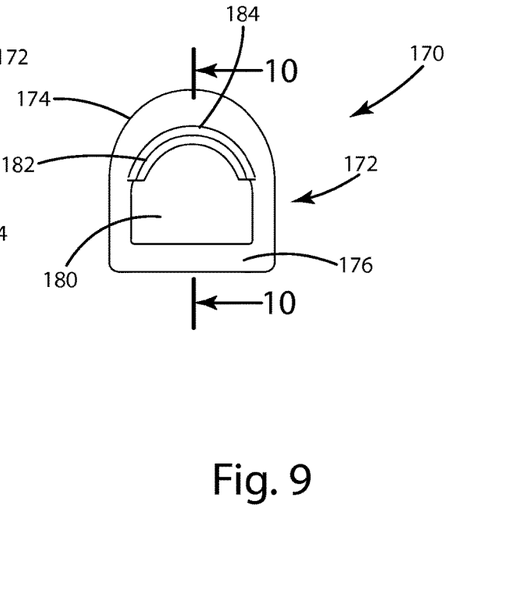
Figure 10:
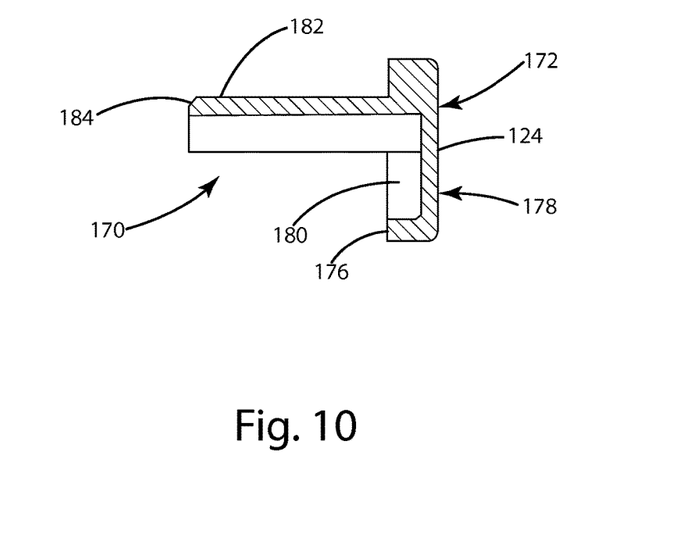
FIG. 10 is a sectional, side view of the end cap lead in shown in FIG. 9, taken along section lines 10-10 of FIG. 9.
Figure 11:
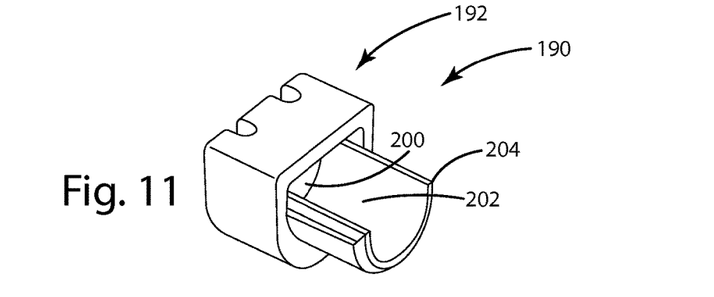
FIG. 11 is an underside perspective view of the end cap trailing end of the diffused flexible LED linear light assembly shown in FIGS. 1-4.
Figure 12:
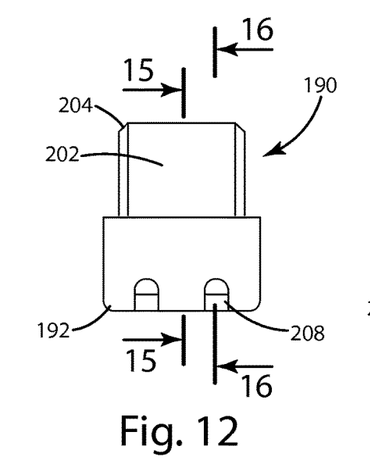
FIG. 12 is an underside elevation view of the end cap trailing end shown in FIG. 11.
Figure 13:
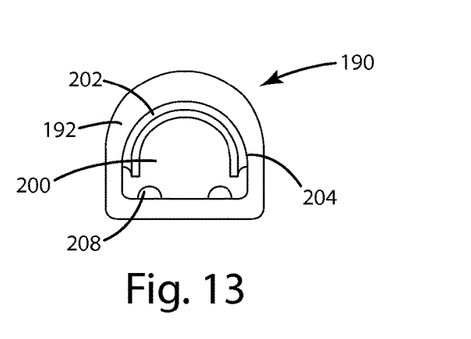
FIG. 13 is an end, elevation view of the end cap trailing end shown in FIG. 11.
Figure 14:
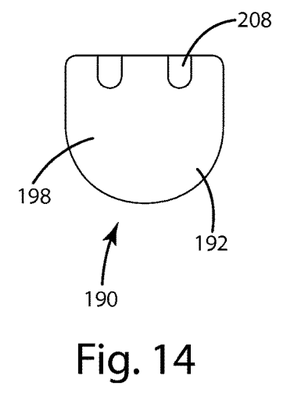
FIG. 14 is an end view of the end cap trailing end shown in FIG. 11, as viewed from the exterior of the diffused flexible LED linear light assembly, and as further shown in an upside down configuration.
Figure 15:
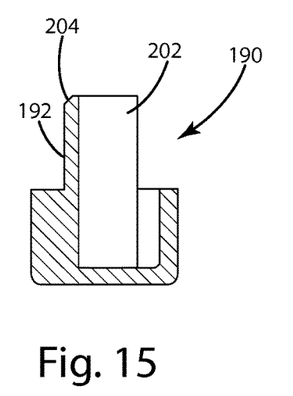
FIG. 15 is a sectional, side view of a portion of the end cap trailing end shown in FIG. 12, and taken along section lines 15-15 of FIG. 12.
Figure 16:
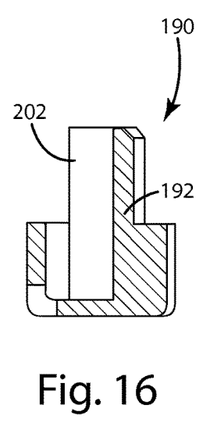
FIG. 16 is a further side, sectional view of the trailing end cap shown in FIG. 12, taken along section lines 16-16 of FIG. 12, and effectively showing a side, sectional view of the end cap trailing end from an opposing direction of the side, sectional view shown in FIG. 15.
Figure 17:
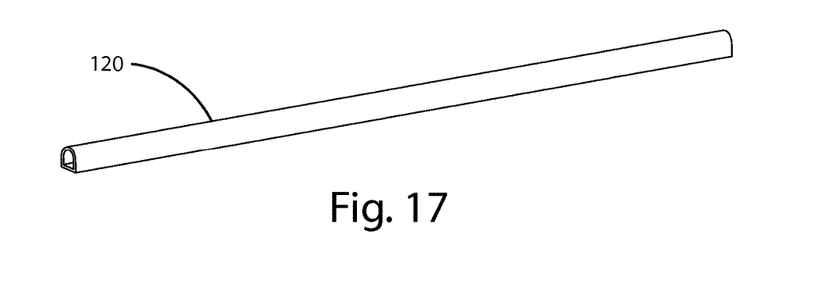
FIG. 17 is a perspective view of the translucent housing of the diffused flexible LED linear light assembly as shown in FIGS. 1-4.
Figure 18:
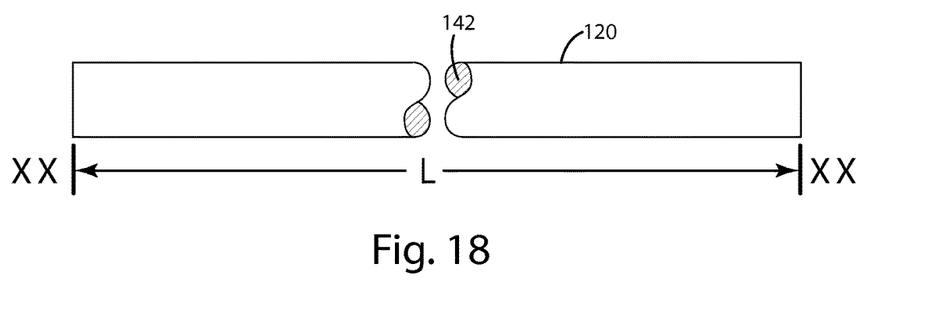
FIG. 18 is a side, elevation view of the translucent housing shown in FIG. 18.
Figure 19:
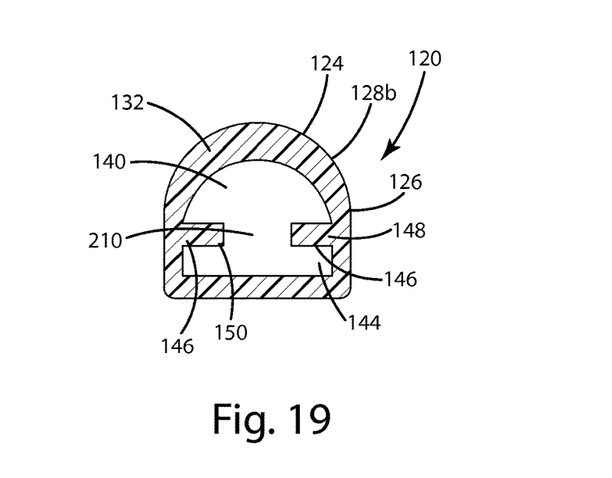
FIG. 19 is a sectional, end view of the translucent housing shown in FIG. 18.

Turning first to the end cap lead end 170 and with specific reference to FIGS. 8, 9 and 10, the end cap 170 provides a sealed connection with the translucent housing 120. The end cap 170 includes an outer body 172, as primarily shown in FIGS. 8 and 9. As particularly shown in FIG. 9, the outer body 172 includes a curved section 174 and a lower flat section 176. The section 174 and section 176 are preferably integral with each other. Of particular importance, the outer body 172 is sized and configured so as to essentially "match" the cross sectional configuration of the translucent housing 120. With respect to the outer body 172, the body 172 comprises an outer face 178, primarily shown partially in FIG. 3 and in FIG. 10. On an opposing side of the outer face 178, the outer body 172 includes a hollow interior area 180, again shown primarily in FIGS. 8, 9 and 10.

In accordance with certain concepts of the invention, the end cap 170 further includes an inner projection 182. The inner projection 182 is shown in FIGS. 8 and 9, and also shown in the sectional view of FIG. 10. The inner projection 182, as apparent from the drawings, is of an arcuate shape with a partially beveled end 184 at the terminal portion of the projection 182. The inner projection 182 is sized and configured so as to be received within the curved or arcuate section 124 of the translucent housing 120. In fact, the translucent housing 120 and the end cap 170 are particularly sized and configured so that the inner projection 182 abuts the inner surface 142 of the housing 120. This configuration is particularly shown in FIG. 7. With reference to both FIGS. 5 and 7, the end cap 170 is sealed with the translucent housing 120 through the use of an adhesive 186. The adhesive 186 can be any of a number of commercially available adhesives suitable for bonding the materials. Also, glues or similar sealing agents, which are preferably water resistant and UV-stable can be utilized. For further sealing of the end cap 170 to the translucent housing 120, coating material 188 having a silicone base (see FIGS. 5 and 7) can be utilized. With this configuration, and again with the appropriate sizing of the various elements, the end cap 170 is secured to the translucent housing 120 in a manner so that the end cap 170 mounts flush with the outer surface of the translucent housing profile. This configuration is in contrast to one where a "step" or other discontinuity is formed, which would occur if the end cap 170 was located "outside" of the profile of the translucent housing 120. This flush-type configuration between the translucent housing 120 and an end cap is particularly shown in FIG. 1 with respect to the translucent housing 120 and the end cap trailing end 190. With this configuration utilizing the inner projection 182 and providing for a flush mounting between the end cap 170 and the translucent housing 120, the mounting of the end cap 170 is facilitated and made easier for the assembler. In addition, the aesthetics of the overall diffused flexible LED linear light assembly 100 are significantly improved, relative to a configuration where the end cap is not flush mounted with the housing.

The end cap trailing end 190 will now be described, primarily with respect to FIGS. 1, 3, 5, 7 and 11-16. It should be noted that the trailing end cap 190 is substantially similar in sizing and construction to the end cap lead end 170, but with certain additional elements primarily related to providing means for receiving the electrical pigtails 108. More specifically, the end cap 190, like the end cap 170, includes an outer body 192, as primarily shown in FIGS. 11, 12, 15 and 16. As particularly shown in FIG. 11, the outer body 192 includes a curved section 194 and a lower flat section 196. The section 194 and section 196 are preferably integral with each other. Of particular importance, the outer body 192 is sized and configured so as to essentially "match" the cross-sectional configuration of the translucent housing 120. With respect to the outer body 192, the body 192 comprises an outer face 198, primarily shown in FIGS. 1 and 14. On an opposing side of the outer face 198, the outer body 192 includes a hollow interior area 200, primarily shown in FIGS. 3, 11 and 13.

In accordance with certain concepts of the invention, and similar to the end cap lead end 170, the end cap 190 further includes an inner projection 202. The inner projection 202 is particularly shown in FIGS. 3, 11-13 and 16. The inner projection 202, as apparent from the drawings, is of an arcuate shape with a partially beveled end 204 at the terminal portion of the projection 202. The inner projection 202 is sized and configured so as to be received within the curved or arcuate section 124 of the translucent housing 120. In fact, the translucent housing 120 and the end cap 190 are particularly sized and configured so that the inner projection 202 abuts the inner surface 142 of the housing 120. This configuration is shown in FIG. 7. With reference to both FIGS. 5 and 7, the end cap 190 is preferably sealed with the translucent housing 120 through the use of the adhesive 186 previously described with respect to end cap 170. For a further sealing of the end cap 190 to the translucent housing, coating material 188 having a silicone base (see FIGS. 5 and 7) can be utilized. With this configuration, and again with the appropriate sizing of the various elements, the end cap 190 is secured to the translucent housing in a manner so that the end cap 190 mounts flush with the outer surface of the translucent housing profile. This configuration is in contrast to one where a "step" or other discontinuity is formed, which would occur if the end cap 190 was located "outside" of the profile of the translucent housing 120. This flush-type configuration between the translucent housing and the end cap 190 is particularly shown in FIG. 1. In accordance with the invention, and with this configuration utilizing the inner projection 202 and providing for a flush mounting between the end cap 190 and the translucent housing 120, the mounting of the end cap 190 is facilitated and made easier for the assembler. In addition, the aesthetics of the overall diffused flexible LED linear light assembly 100 are significantly improved, relative to a configuration where the end cap is not flush mounted with the housing.

As earlier stated, the end cap trailing at 190 is substantially similar to the end cap lead end 170. One distinction relates to the end cap 190 having means for receiving elements for connecting the flexible LED linear light component 102 to the previously described external source of electrical power 110. Specifically, and as particularly shown in FIGS. 1, 3, and 11-16, the end cap trailing end 190 includes a pair of connection apertures 208. The connection apertures 208 are utilized to receive the electrical pigtails 108 which were previously described herein with respect to FIG. 20, and provide components for purposes of transmitting electrical power from the external source of electrical power 110 to the flexible LED linear light component 102. These connection apertures 208 are not an absolute necessity for the end cap lead end 170, but could be provided if required for purposes of "stringing together" a number of flexible LED linear light assemblies 100.

Another concept associated with the invention relates to the interior structure of the translucent housing 120. As previously described, the translucent housing 120 includes an open interior area 140, as shown, for example, in FIGS. 2, 4, 7 and 19. Below the open interior area 140 is an area within the translucent housing 120 which is referred to in the drawings as hidden area 144. This hidden area 144 is also shown in FIGS. 2, 4, 7 and 19. The open interior area 140 and the hidden area 144 are formed and separated by a pair of inwardly directed projections 146. These inwardly directed projections 146 are formed integrally with the translucent housing 120 as the lower portion of the translucent curved or arcuate section 124. These projections 146 are shown as the first inner projection 148 and second inner projection 150. These inner projections form a channel 210 which separates the open interior area 140 from the hidden area 144. By adding the channel 210 formed by the inwardly directed projections 146, and by locating the projections on the bottom inside portion of the translucent housing 120, it is then possible to locate the flexible LED linear light component 102 securely against the bottom of the flat base section 122.

To form the translucent housing 120 with the inwardly directed projections 146, a method of manufacture is utilized whereby the flexible LED linear light component 102 is essentially "pulled" through an extrusion of the translucent housing material. As earlier stated, the channel formed by the projections 146 provides the capability of locating the flexible LED linear light component 102 on the bottom portion of the housing 120. This method of manufacture facilitates assembly, while also "setting" the geometry for a successful air or silicone gel filled gap as described in previous paragraphs.

It will be apparent to those skilled in the pertinent arts that other embodiments of flexible LED linear light assemblies in accordance with the invention can be designed. That is, the principles of flexible LED linear light assemblies in accordance with the invention are not limited to the specific embodiment described herein. Accordingly, it will be apparent to those skilled in the art that modifications and other variations of the above-described illustrative embodiments of the invention may be effected without departing from the spirit and scope of the novel concepts of the invention.

The invention claimed is:

1. An LED light assembly comprising:
   a flexible LED linear light component having a plurality of LEDs supported on a flexible base;
   a flexible translucent housing having an elongated configuration for enclosing said flexible LED linear light component, said housing comprising a base, a first and second side wall extending upwardly from the base, and a curved portion extending between the first and second side walls;
   wherein the thickness of the base and the first and second side walls is constant; and
   wherein the thickness of said translucent housing is varied along at least a segment of the curved portion so as to vary relative percentages of light transmissions through said translucent housing, wherein a housing wall of said curved portion decreases in thickness as the angle formed by the plane of said LEDs and a straight line drawn from said plane of said LEDs through said translucent housing wall also decreases; and
   wherein the varied segment of the curved portion includes the apex of the curved portion.

2. The LED Light assembly of claim 1, wherein said thickness of said curved portion of said translucent housing is varied in cross-section so as to allow light transmission in areas of weakest LED output strength, and in view of said thickness variation, the light output intensity through said translucent housing is substantially even or constant circumferentially and radially through said curved portion of said translucent housing or lens.

3. The LED Light assembly of claim 2, wherein said light assembly is sized such that:
   a plane of said LEDs is spaced a distance IH from an interior apex located on an inner surface of said translucent housing, measured from said LEDs along an axis AA which is perpendicular to said plane of said LEDs;
   said translucent housing laterally encloses an internal gap between said LEDs and said inner surface of said translucent housing, said internal gap being filled with air or silicone gel; and
   said distance IH is of a sufficient size so that intersecting ray patterns from light rays generated by adjacent ones of said LEDs can exhibit combination and interference prior to contacting said inner surface.

4. The LED Light assembly of claim 3, wherein a change in transmissibility from said air or silicone filled gap to materials composing said translucent housing, in combination with scattering of said light rays through reflection and transmission causes a diffusion pattern of light intensity to be substantially even or constant along an axial length of said flexible LED linear light component and said translucent housing.

5. The LED Light assembly of claim 3, wherein dimensions of said translucent housing or lens, said internal gap, said distance IH, and spacing of adjacent ones of said LEDs is such that dark zones and hot spots are substantially eliminated for resultant light viewed external of said translucent housing.

6. The LED Light assembly of claim 1, wherein said assembly further comprises an end cap for enclosing said flexible LED linear light component at a lead end and a trailing end and said end cap comprises an end cap lead end and an end cap trailing end.

7. The LED Light assembly of claim 6, wherein said assembly further comprises an electrical connection to said flexible LED linear light component and a source of electrical power.

8. The LED Light assembly of claim 7, wherein said electrical connection comprises a pair of electrical pigtails connected between said flexible LED linear light component and said source of electrical power.

9. The LED Light assembly of claim 8, wherein characterized in that said end cap lead end comprises one or more apertures for receiving said electrical connection from said source of electrical power and permitting entrance into an interior of said translucent housing for electrical connection to said flexible LED linear light component.

10. The LED Light assembly of claim 1, wherein said translucent housing comprises a curved section having translucent properties, and wherein the base is integral with said translucent section but is opaque to not allow transmission of light from said LEDs therethrough.

11. An LED light assembly comprising:
    a flexible translucent housing having an elongated configuration and comprising a base, a first and second side wall extending upwardly from the base, and a curved portion extending between the first and second side walls;
    a flexible LED linear light component positioned within said flexible translucent housing, said flexible LED linear light component having a plurality of LEDs supported on a flexible base;
    a pair of inwardly directed projections extending toward one another and positioned between the flexible linear light component and the curved portion of the flexible translucent housing, having a space therebetween and positioned adjacent a bottom inner area of said translucent housing, so as to form a channel and provide the capability of locating said flexible LED linear light component against a flat portion of said housing;
    wherein the housing forms a direct and uninterrupted path between the LED linear light component and said curved portion of said translucent housing.

12. The LED light assembly of claim 11, wherein the inwardly directed projections extend inward from the first and second sidewalls.

13. The LED light assembly of claim 11, wherein said flexible LED linear light component is positioned between said base and said inwardly directed projections.

14. The LED light assembly of claim 11, wherein the width of said flexible LED linear light component is greater than a space between said inwardly directed projections.

15. The LED light assembly of claim 11, wherein the internal volume of the housing is filled or partially filled with a silicon gel.

* * * * *